United States Patent [19]

Buckner

[11] 4,414,651

[45] Nov. 8, 1983

[54] INTEGRATED WELL LOGGING SYSTEM AND METHOD

[75] Inventor: Guy O. Buckner, Houston, Tex.

[73] Assignee: Dresser Industries, Inc., Dallas, Tex.

[21] Appl. No.: 211,882

[22] Filed: Dec. 1, 1980

[51] Int. Cl.³ .............................................. G01V 1/40
[52] U.S. Cl. ....................................... 367/27; 367/28; 367/31
[58] Field of Search ........................ 367/27, 28, 30, 33, 367/903, 911, 31; 181/102, 103, 106

[56] References Cited

U.S. PATENT DOCUMENTS 3,952,282 4/1976 Zemanek, Jr. ....................... 181/102
4,210,965 7/1980 Ingram ................................. 367/27
4,223,398 9/1980 Blalock ................................ 367/27

OTHER PUBLICATIONS

F. M. Eaton, et al., "The Cyber Service Unit", Oct. 1976, *Journal of Petroleum Technology*.

Primary Examiner—Nelson Moskowitz
Attorney, Agent, or Firm—Richard M. Byron; Patrick H. McCollum

[57] ABSTRACT

An improved well logging technique is provided for more accurately deriving measurements of sub-surface earth formations, for processing and recording such measurements to record them in reproducible form, and to more informatively display such measurements. Other significant features and aspects of the overall technique include improved methods and apparatus for deriving such measurements in digital form and for merging or combining two or more such measurements in one storage.

In a particular embodiment of the invention, the logging sonde is provided with means for forming the logging data into discrete "frames" of data expressed in digital form, and for delivering such frames of data to the surface preferably in response to a command signal which is generated at the surface in correlation with the depth of the sonde in the borehole. Alternatively, the data may include representations of an acoustic signature which may be sent to the surface in analog form at which time they are transformed into digital form.

At the surface, the frames of digital data are preferably accumulated and thereafter processed. Furthermore, compatible data which is historical in character may conveniently be merged with the data thus generated, and may either be correlatively recorded and displayed, or a correlative function of such data and other historical data may thereafter be derived and recorded. Provision is included for deriving a recordable and reproducible digitized acoustic signature of such formations and for deriving an acoustic velocity measurement from the digitized acoustic signature.

5 Claims, 11 Drawing Figures

INTEGRATED WELL LOGGING SYSTEM AND METHOD

BACKGROUND

This invention relates to improved well logging methods and apparatus, and more particularly relates to novel methods and apparatus for providing a plurality of functionally integrated subsurface measurements and for providing improved measurements and representations of acoustic energy transmitted through the borehole.

Since no one earth parameter, or even any one combination of such parameters, can of itself provide a definitive and conclusive indication of the presence of oil and gas in commercial quantities, there has been a continuing need to perform as many different types of logging measurements as possible. It is not uncommon for a particular measurement to provide data which cannot be clearly and reliably interpreted in the absence of other different but functionally correlative measurements which may, for example, have been taken at a different time or from a nearby well-site. This, in turn, has also contributed to the need to provide logging sondes and systems for generating a plurality of different logging measurements, whereby the array of such measurements can be correlatively recorded so that a data point from a particular logging measurement may be associated with a corresponding data point from another measurement generated at a correlative depth.

It has further become desirable not only to provide technology for storing logging data with correlative logging data obtained at different times or locations at the same depths, but also to provide a technique whereby such data may be generated and stored in a form such that it can be conveniently retrieved to provide information not easily obtained by mere comparative inspection of data obtained by conventional techniques, and whereby functional conclusions may be derived in a more accurate manner for judging whether to complete the well at a particular depth.

One such logging measurement which is desirable to generate in a form suitable for convenient merging with other data and retrieval for analysis is the electrical representation of acoustic energy oscillations from an acoustic logging tool as they traverse the borehole, known as the "acoustic signature."

In the past, it was conventional to record and process such signatures in analog form. However, many problems have been associated with such techniques, including noise susceptability, inaccuracies associated with well-known analog amplifier "drift" problems and the like.

These and other disadvantages are overcome with the present invention, however, wherein improved well logging methods and apparatus are provided for correlatively merging two or more sets of logging data which may then be employed in computerized analysis. Moreover, novel methods and apparatus of the present invention provide one particular logging measurement, namely the acoustic signature, in a digitized form which is particularly suited for convenient merger as well as for providing improved measurement of acoustic travel time.

SUMMARY OF THE INVENTION

In a preferred embodiment of the invention, a well logging system is provided which, in this overall concept includes a sonde which generates electrical representations of a selected plurality of lithological characteristics, a logging cable for suspending and passing the sonde through the borehole past the formations of interest, and appropriate circuitry at the surface for processing and recording data provided by the sonde. More particularly, the sonde will preferably include a circuit whereby one or more of these measurements are converted or formed into "frames" of digital representations which, in turn, are transmitted through the logging cable to the surface in response to a depth-dependent command signal.

The sonde will also include provision for alternately transmitting an analog representation or "signature" of acoustic signature between transmissions of the frames of digital data which may be translated into digital form or "digitized" by a suitable analog-to-digital converter for later processing. Finally, the sonde will appropriately include circuitry which, in response to the depth-dependent command signal, will actuate or gate one or more sensors or other circuits such as the acoustic transmitter or one or more acoustic receivers.

At the surface, all data signals are stored for sequential sampling and processing, before being recorded and displayed. As will hereinafter be explained, it is a particular feature of the invention to coordinate different logging measurements to provide more information. Accordingly, provision is included for converting all analog signals (such as the acoustic signature signals) to digital form before storage.

The surface equipment includes both a "primary" storage, whereby real-time data signals from the sonde are stored also in response to the depth-dependent command signal prior to processing. In addition, however, a "secondary" magnetic tape storage is provided whereby these real-time signals, which are all in digital form, may also be stored for later reproduction and re-use.

The surface equipment comprises sampling circuitry, whereby the data in the primary storage may be sampled on a time-dependent basis in accordance with a predetermined sequence. In addition, the sampling circuit not only cycles through the real-time data in the primary storage, but may also cycle out historical logging data previously passed into the secondary storage, as may be deemed appropriate.

It is a particular feature of the present invention to provide for correlatively merging two or more sets of logging data as a function of borehole depth. In this respect, the different data may be separately, although correlatively, included in a common display or record, or a function of such logging data may be appropriately derived and included with the individual logging signals being displayed and recorded. In this respect, novel circuitry and techniques are provided for more effectively correlating these sets of data, in order to enhance the informative aspects of this data.

Many of the foregoing features may be effectively incorporated and used either separately or as a part of a generally conventional well logging system. For example, the aforementioned merger capability may be effectively used to combine two or more historical measurements separate and apart from any real-time data signals wherein each such measurement was generated or sampled at preselected depths in response to a depth dependent command signal. However, merger of both the real-time and historical data at one or more observation sites which are remote to the well site may also be accomplished. The real-time data may be transmitted to a remote site, recorded, and then merged at the remote site with historical data present at the remote site.

In a preferred embodiment of the invention, as the sonde traverses the borehole, it will sequentially generate and transmit to the surface measurements at preselected increments along the borehole. Appropriate merger circuitry will periodically compare the current depth of the sonde and the depth at which the first of a plurality of historical measurements to be merged was derived, also sequentially generated and stored. These historical measurements are preferably also derived from identical preselected increments as the real-time measurements. As the sonde progresses up the bore hole, real-time measurements thus produced will be recorded.

When the depth at which the next measurement to be made by the sonde reaches the depth at which the first historical measurements were made, the merger circuitry detects this state, causing the merger process to begin. The merger circuitry will thereafter alternatively cause to be recorded in a storage device, data samples generated by the sonde which have been recorded and correlative historical data samples retrieved from another storage wherein the sonde and historical samples were generated at the same depths. This correlative retrieval from storage, matching, and recording in succession of a real-time stored sample and a historical sample derived at a correlative depth, followed by a next real-time sample and historical sample both derived at a next different preselected and discrete borehole elevation will continue throughout the course of the log.

If the historical data samples begin at a deeper elevation within the borehole than the sonde, they may be selectively read from storage and recorded in another storage device until the merger circuitry detects that the next historical data sample to be read was derived at the current sonde depth at which the next real-time measurement is to be made. The merger process will then begin, whereby, also in alternate fashion, selected real-time data samples from the sonde will be recorded and retrieved followed by historical data samples retrieved from storage which were derived at correlative subsurface depths. By periodic interrogation of the current sonde depth prior to "merger" or the correlative recording in the same storage of both real-time and historical data derived at identical depths, the start of the merger process is made independent of sonde movement as well as the relative starting loction of the sonde and the depth at which initial historical data was derived.

Accordingly, it is a feature of the present invention to provide improved methods and apparatus for making integrated measurement of subsurface earth formations.

It is also a feature of the present invention to provide improved well logging methods and apparatus whereby one or more well logging measurements, taken at an earlier date or different location, may be reproduced and functionally merged with other later measurements.

It is further a feature of the present invention to provide improved well logging methods and apparatus for systematically merging two or more sets of well-logging measurements according to preselected lithological relationships It is another feature of the present invention to provide improved well logging methods and apparatus for deriving subsurface earth measurements in digital form.

It is a feature of this invention to provide improved methods and apparatus of deriving and correlatively recording a plurality of digital well logging measurements of the character of earth substances traversed by a borehole.

It is another feature of this invention to provide for deriving and correlatively recording a plurality of historical digital well logging measurements taken at the same depths in the borehole.

It is another feature of the present invention to provide improved well logging methods and apparatus for merging two or more logging measurements derived at different times having increased reliability and reduced data storage requirements.

It is also a feature of the present invention to provide a well logging system for investigating earth parameters and the like in a borehole, comprising first signaling means for deriving a first electrical signal representative of at least one of said earth parameters; second signaling means for deriving a second electrical signal representative of at least one of said earth parameters; third signaling means for deriving from said first signal a third electrical signal functionally representative of the magnitude of said first signal in relationship to preselected depths in said borehole; recording means for receiving and correlating said second and third electrical signals as a function of depth.

It is another feature of the present invention to provide a well logging method for investigating earth parameters and the like in a borehole, comprising deriving a first electrical signal representative of at least one of said earth parameters; deriving a second electrical signal representative of at least one of said earth parameters; deriving from said first signal a third electrical signal functionally representative of the magnitude of said at least one of said earth parameters at preselected depths in said borehole; and receiving and correlating said second and third electrical signals as a function of depth.

It is a further feature of the present invention to provide an apparatus of investigating subsurface earth formations traversed by a borehole, comprising pulse generator means for generating a pulse of acoustic energy within said borehole and along an adjacent portion of said earth formations, signal generator means for generating a real time electrical signal functionally related to said acoustic energy within said earth formations, and conversion means for deriving from said real time signal a digital representation of the configuration of said acoustic energy in said formations.

It is a further feature of the present invention to provide a method of investigating subsurface earth formations traversed by a borehole, comprising generating a pulse of acoustic energy within said borehole and along an adjacent portion of said earth formations, generating a real time electrical signal functionally related to said acoustic energy within said earth formations, and deriving from said real time signal a digital representation of the configuration of said acoustic energy in said formations.

These and other features and advantages of the present invention will become apparent from the following detailed description, wherein reference is made to the figures in the accompanying drawings.

IN THE DRAWINGS

DETAILED DESCRIPTION OF THE DRAWINGS

Figure 1:
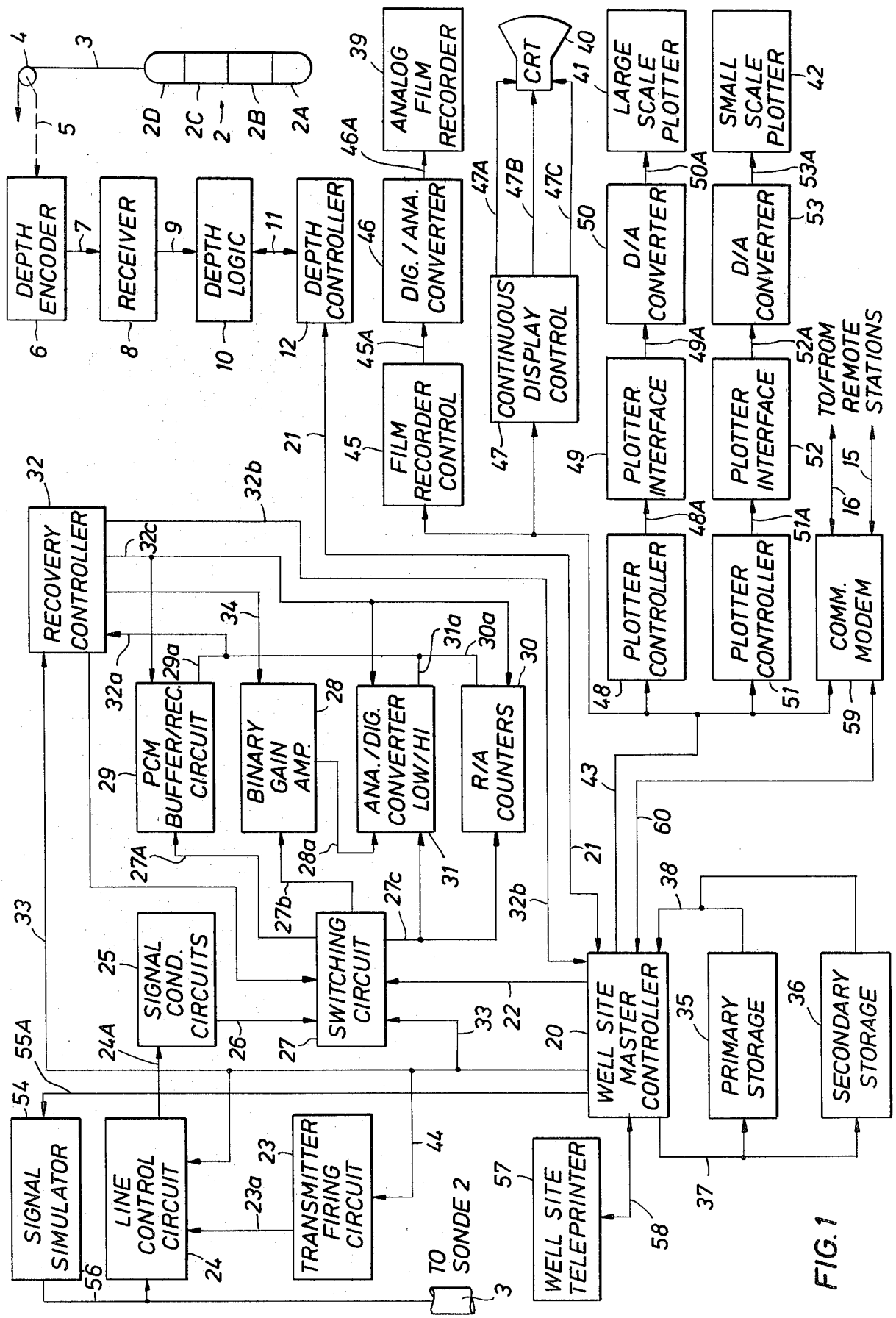
FIG. 1 is a simplified functional overall representation of an embodiment of the present invention.

Referring to FIG. 1, there may be seen a simplified functional diagram of one embodiment of the present invention, and wherein there is more particularly shown the logging sonde 2 which may suitably include such portions as a radioactivity logging section 2A, an induction logging section 2B, an acoustic logging section 2C, and a pulse code modulation section 2D, all arranged to provide appropriate measurements of the lithology surrounding a subsurface borehole (not depicted). Measurements from these sections may be conveniently transferred from the borehole to the surface by way of a conventional logging cable 3 which is arranged to rotate a sheave wheel 4, or the like, to provide a correlative indication of the borehole depth at which such measurements are taken. More particularly, the sheave wheel 4 may also be conveniently coupled to suitable depth encoder circuitry 6, by a drive shaft 5 or the like, whereby the depth encoder circuitry 6 will deliver a functionally correlative depth measurement signal 7 to the surface portion of the well site system, in conjunction with the measurements provided by the logging cable 3.

As previously stated, it is a feature of the well site system depicted functionally in FIG. 1 to transmit fully correlated logging measurements to a suitable base observation and control station such as that referred to in U.S. Patent Application Ser. No. 949,592, filed Oct. 10, 1978, and which, in turn, may be suitably located at a position remote from the location of the well site system. Accordingly, the well site system will appropriately encode and condition these measurements to provide correlative indications to the remote base station, at the time such measurements are received from the logging cable 3, through a suitable communications link 15 which may be a conventional telephone line, radio communication satellite, or the like. Furthermore, like signals may also be provided to the customer or user at his respective user station (not depicted) which, in turn, may be located remotely from both the well site system and the operator's base station (not depicted). These indications may also be conveniently transferred to the user stations by a similar communications link 16 interconnecting the well site system with the user station, and thereafter relayed from the base station to the user station on such communications link.

It should be noted that the well site system suggested by FIG. 1 may be operated directly by the base station, and therefore the communications link 15 may also include provision for delivering suitable control signals from the base station to the well site system by way of the communications link 15. Similarly, the communications link may be used to provide control signals from the base station to the user station or, in some circumstances, to provide control signals from the user station to the well site system or base station, by way of the communications link 16.

Referring again to FIG. 1, there may be seen a simplified functional diagram of the uphole circuits comprising the apparatus located at or composing the well site system. As will hereinafter be explained in detail, the sections of the logging sonde 2 are preferably adapted to deliver their respective measurements to the conductors composing the logging cable in a manner whereby all of the measurements are delivered to the surface together. It should be noted that information may also be desirably transferred from surface circuitry to the borehole for reasons to be hereinafter explained in greater detail. For example, it may be desirable to control various transmitters and receivers contained in acoustic logging section 2C from the surface. Accordingly, it may be seen from FIG. 1 that at appropriate times and in response to a command signal 44 from a well site master controller 20, transmitter firing circuitry 23 may be caused to generate transmitter firing signals 23A for purposes of controlling the various circuitry in the acoustic logging section 2C of the sonde 2. This transmitter firing signal 23A may preferably be delivered to a conventional ine control circuitry 24 which couples the signal 23A to the appropriate conductor within the logging cable 3.

As indicated in FIG. 1, when measurement signals are received from sonde 2, the output of the logging cable 3 is preferably also delivered to a line control circuit 24 which, in turn, passes the signals as its output 24A to a suitable arrangement of signal conditioning circuits 25 for filtering, gain adjustment, and other suitable processing. The conditioned logging signals 26, which are provided by the signal conditioning circuits 25, may then be delivered through a suitable switching circuit 27 to either a PCM buffer/receiver circuit 29, or to a binary gain amplifier 28, or in a further alternative, to a low speed/high speed analog-to-digital converter 31 and suitable radioactivity pulse counters 30, by way of signals 27a, 27b, or 27c, respectively.

It is well known that the outputs from a conventional sonde 2 will be in either analog form, or in the case of radiological measurements, will be composed of pulses which occur in a random manner. As will hereinafter become apparent, however, it is particularly desirable for the purposes of the instant invention, that these signals be presented to the surface circuitry in digital form. Accordingly, and as more particularly depicted in FIG. 1, the sonde 2 will preferably include a pulse code modulation or "PCM" circuit 20 for encoding such signals in digital form before delivery to the PCM buffer/receiver circuit 29 shown in FIG. 1. If the signals are not so encoded, however, then they may be conveniently applied to a suitable analog/digital converter 31 or the like, before being processed and recorded. Alternatively, pulses deriving from radiological measurements may conveniently be applied to appropriate counters 30 and the like, which will then suitably deliver their outputs in digital form.

Referring again to FIG. 1, it will be seen that the signals being generated by the radioactivity section 2A of the sonde 2, will accordingly originate as a train of electrical pulses indicating the occurrence of radiations eminating from the borehole materials surrounding the sonde 2, and will therefore be suitably delivered to the pulse counters 30 which, alternatively, produce a suitable digitized representation of this data as output signal 30A. On the other hand, the output signals from the induction logging section 2B and the acoustic logging section 2C of the sonde 2 will, conventionally, be delivered to the surfae in the form of analog measurements representative of lithological characteristics of the borehole material adjacent the sonde 2. Accordingly, such outputs from switching circuit 27 which compose signal 27c will, in turn, be converted to digital representations of the data sought to be obtained. These representations, which are indicated as output 31A, will accordingly be conducted by a suitable lead 32A and the like to an input of the logging signal recovery controller 32.

It will be noted that the analog-to-digital converter 31 receives input signals 27c and 28a from both the switching circuit 27 and the binary gain amplifier 28. The reason for this is that, in some cases, the signals generated from the induction logging section 2B and the acoustic logging section 2C of the sonde 2 are sufficient in amplitude to be applied directly to the analog-to-digital converter 31. On the other hand, such signals are often of such a magnitude, or, alternatively, attenuated by the logging cable 3 to an extent that they exceed the dynamic range of converter 31 and must accordingly be attenuated or amplified, respectively, before they can be properly handled by the converter 31. Accordingly, the switching circuit 27 will respond to route such signals to the binary gain amplifier 28 prior to conversion of the analog signal into digital form at converter 31.

More particularly, the well site master control 20 is adapted to generate another command signal 33 to the switching circuit 27 to route its output either in the form of a digital signal 27a to the PCM buffer/receiver circuit 29, or in the form of an analog signal 27c which is delivered to the converter 31 or to the pulse counters 30. If, as hereinbefore stated, the signal 27c is of an insufficient amplitude to be properly handled by the converter 311, or if the amplitude is too great for the dynamic range of the converter 31, then the master controller 20 will, according to program, generate a command signal 22 to cause the switching circuit 27 to deliver its output signal 27b (instead of signal 27c) to the binary gain amplifier 28. It will be noted that binary gain amplifier 28 may be provided with a suitable gain control signal 34 which serves the purpose of continuously adjusting the gain of binary gain amplifier 28 in response to command signal 33 delivered to recovery controller 32 from master controller 20. It will be seen that because the input to analog-to-digital converter 31 may be periodically interrogated by master controller 20 in a manner to be described hereinafter, master controller 20 may cause gain control signal 34 to appropriately adjust gain of binary gain amplifier 28 so as to insure that input signal 28a is maintained within the dynamic range of analog-to-digital converter 31. Accordingly, the amplified signal 28a, which is produced by the binary gain amplifier 28, is then delivered to the converter 31 in lieu of the output signal 27c.

Referring again to FIG. 1, it may, for the purposes of illustration, be assumed that the sonde 2 is composed of a plurality of sensing elements such as the radioactivity logging section 2A, the induction logging section 2B, and the acoustic logging section 2C, and that all of these sensors are continually and simultaneously delivering meaningful data signals to the logging cable 3. It is preferable that the well site systems or and handle these signals in a manner to distinguish one from another, as well as to handle such signals in correlation with appropriate indication of the depth at which such signals originated. Accordingly, the analog-to-digital converter 31, the pulse counters 30, and PCM buffer/receiver circuit 29, will all include appropriate buffer circuitry, whereby these signals may be stored until the well site master controller 20 generates its command signal 33 to cause the recovery controller 32 to interrogate the components selected. Upon such interrogation, which is indicated in FIG. 1 by the interrogation signal 32c, the recovery controller 32 will cause the appropriate or selected component to transfer one of outputs 29A, 30A or 31A to the recovery controller 32 which, in turn, conducts such information to the master controller 20 in the form of output 32b. Upon receiving output 32b, the master controller 20 conducts such output to either the primary storage facility 35, or the secondary storage facility 36 by means of the input signals 37.

As hereinbefore stated, the measurements provided by the logging sonde 2 must be correlated with an indication of the depth at which such measurements are taken. Accordingly, it should be noted that when the master controller 20 generates its command signal 33, it also generates an appropriate depth data/control signal 21 to cause the depth controller 12 to deliver the information it has previously taken from the output 11 of depth logic 10. Thus, this data, which also passes to the controller 20 by way of the depth data/control signal 21, will be correlated effectively with the logging data signals provided by the recovery controller 32 in the form of output 32b. It will be noted that in order for depth logic 10 to provide appropriate information to depth controller 12, information from depth encoder circuitry 6 may conveniently be transmitted to receiver 8 by means of depth measurement signal 7, and from receiver 8 to depth logic 10 on receiver output 9.

There may further be seen in FIG. 1 visual display and recording devices which may preferably include analog film recorder 39, visual display 40, and a suitable large scale plotter 41 and small scale plotter 42. Information which is desired to be displayed or recorded may be transferred to these various display or recording apparatus from master control 20 through logging data information signal 43. More particularly, information signal 43 may be desirably routed to a film recorder controller 45 which will provide necessary interfacing between master controller 20 and digital-to-analog converter 456, and thereafter communicated from controller 45 to converter 46 on output line 45A. After conversion of the digital information on line 45A by converter 46 to analog information, this analog information may be conveniently coupled by output line 46A to analog film recorder 39. It should be noted that recorder 39 may preferably be a conventional galvanometer type recorder well known in the well logging industry which is particularly suited for recording graphical data and the like associated with well logging operations.

In like manner, data from master controller 20 carried on information signal 43 may also preferably be communicated to continuous display controller 47 which may process these signals to provide output signals 47A, 47B, and 47C which are communicated to visual display 40. More particularly, and as will hereinafter be explained in detail, continuous display controller 47 may preferably process information signal 43 so as to generate a visual picture of desired well logging information over a preselected borehole depth interval which has been traversed by sonde 2.

Still further, it may be seen from FIG. 1 that the information signal 43 may be conveyed to a plotter controller 48 for processing the desired information signal 43, in a manner to be hereinafter described in greater detail, prior to being delivered as input 48A to a suitable plotter interface 49. The function of the interface 49 is to further adapt these information signals 43 for delivery as output 49A to suitable processing circuitry such as a digital-to-analog converter 50, wherein they are converted to an appropriate analog output 50A for recording on film within the large scale plotter 41. In like manner, it my be desirable to display various information signals 43 associated with the well logging operation on a smaller scale than that employed in large scale plotter recorder 41. Accordingly, information signals 43 may be introduced into plotter controller 51 which may suitably process and transfer these signals as output 51A to plotter interface 52 which, after additional signal processing, will communicate these signals as output 52A to suitable circuitry such as a digital-to-analog converter 53 wherein they may be converted to an appropriate analog output 53A to small scale plotter 42. It will be noted that information signals 43 which are provided to analog film recorder 39, large and small scale plotters 41 and 42, respectively, as well as those provided to visual display 40, may be desirably under the control of master controller 20. Accordingly, controller 20 may desirably provide information signals 43 so as to cause display and recording of well logging information in a variety of formats and from a variety of sources. These may include, for example, primary storage 35 and secondary storage 36, which may transfer information stored therein to master controller 20 as storage output 38 and in response to input signal 37.

It will be readily apparent that for purposes of testing the operation of the integrated well logging system herein described, or for purposes of personnel training or the like, it may be desirable to simulate the various signals associated with sonde 2 without the necessity of actually providing the sections of well logging circuitry normally contained therein, and further without the necessity of subjecting the sonde 2 to an actual borehole environment. Accordingly, in FIG. 1 there may be seen a signal simulator 42 which, in response to appropriate simulator command signals 55A, may generate various test signals 56 as hereinbefore mentioned which, for example, may include signals similar to those which might be expected to be present on logging cable 3 from sonde 2. It will further be noted that these test signals 56 may appropriately be delivered to line control circuit 24, thus simulating similar signals on logging cable 3 which may also be delivered to the input of line control circuit 24. While the present invention contemplates automatic performance of the various well logging tasks under control of master controller 20, it may be appreciated that it is often desirable to include provisions for human interaction with the integrated well logging system of the present invention. For example, it may be desirable for a logging engineer to override various functions performs by master controller 20, to adjust the format or scaling of information provided to the various peripheral display devices, or to communicate directly with base station or user station. Conversely, it may further be desirable for master controller 20 to have the capability of outputting information to a human operator. Accordingly, a suitable well site teleprinter 57 may be provided for such communication between master controller 20 and a human operater having an interrogate/respond channel 58 for interrogating or instructing controller 20 in a conventional manner, and also for receiving appropriate information therefrom.

Figure 2:
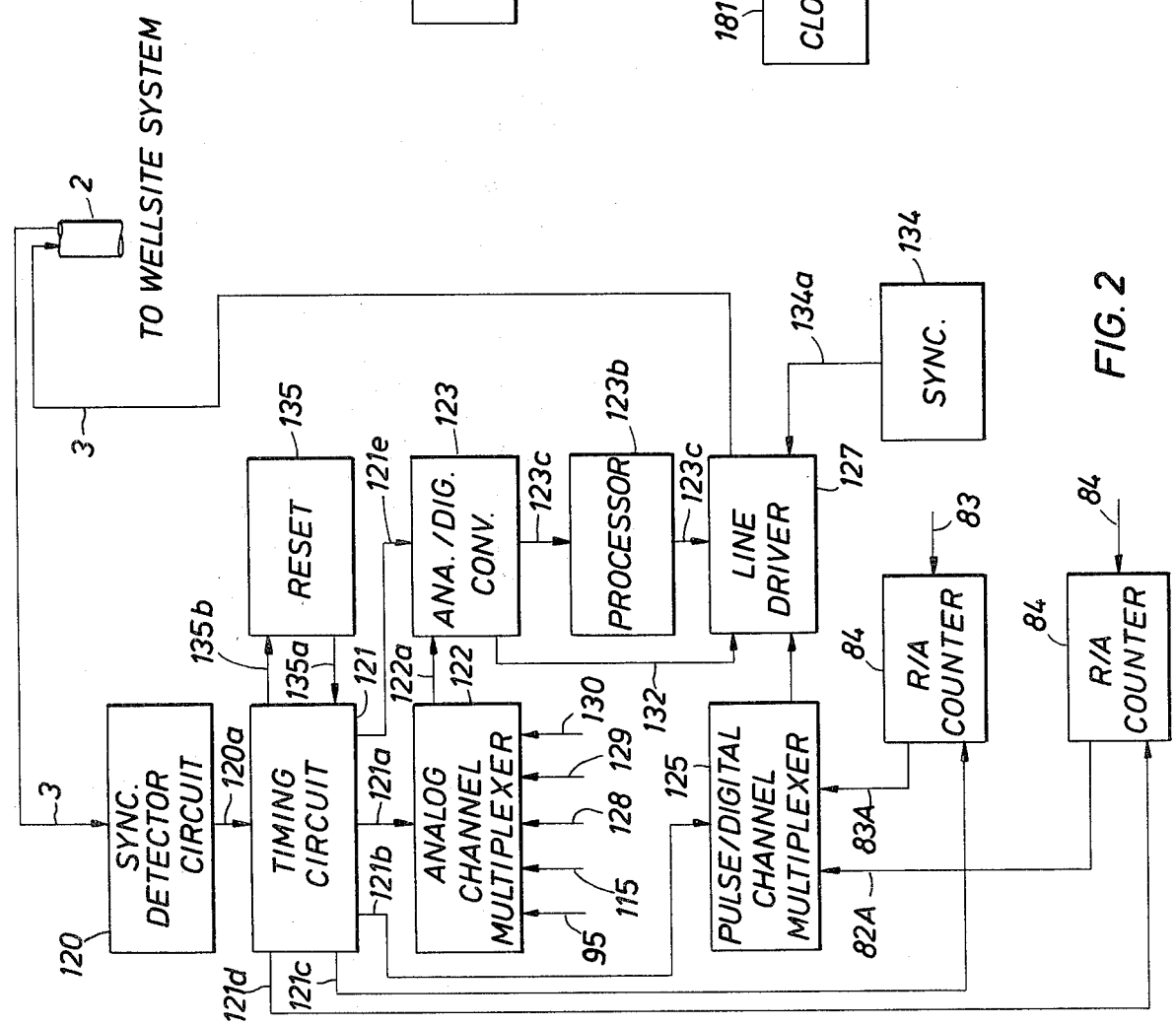
FIG. 2 is a more detailed functional representation of a portion of the sonde depicted in FIG. 1.

Referring now to FIG. 2, there may be seen a functional representation of pulse code modulation section 2D of sonde 2. As will hereinafter be explained in detail, the circuits comprising the pulse code modulation section 2D may deliver a digital representation of measurements obtained by the various logging sections contained in sonde 2 including radioactivity logging section 2A, and induction logging section 2B to the well site system through logging cable 3, preferably in response to depth indications received from well site system. However, it wil be noted that measurements taken in sonde 2 may also be delivered to well site system in a conventional manner without first being processed by pulse code modulation section 2D.

The pulse code modulation section 2D, as depicted in FIG. 2, is adapted to receive commands from the well site system on logging cable 3, which are communicated to synchronization detector circuit 120. Detector circuit 120 is provided to detect information carried on cable 3 related to the information desired to be received from sonde 2 by the well site system, as well as the order in time at which it is desired to be received. For example, if an acoustic signature signal has been generated on the output of the acoustic log section 2C, information on cable 3 may contain this information which will be detected by synchronization circuit 120.

Information regarding acoustic section 2C firing is present on cable 3 because the signals firing the transmitters of acoustic logging section 2C may be generated from the well site system at predetermined depth intervals as previously described. If such an acoustic signature is present and it is desired to transmit the signature directly to the surface in analog form, the presence of the output may be detected by synchronization circuit 120 which may then cause section 2D to transmit information obtained from other logging sections at a time when the output is not present, thus avoiding well known cross-talk problems and the like.

Assuming for illustrative purposes, that it is desired to alternatively transmit to the surface outputs of acoustic logging section 2C followed by data present in pulse code modulation section 2D. When a first pulse is obtained by synchronization circuit 120 signifying the presence, for example, of the first acoustic signature output the detected pulse will be transferred on synchronization output 120a to appropriate timing circuitry 121. Timing circuitry 121 is adapted to provide numerous functions in response to information contained on conductor 7a. Specifically, timing circuit 121 will first generate timing signals 121a and 121b delivered to analog channel multiplexer 122 and pulse/digital channel multiplexer 125, respectively.

It will be noted, as hereinbefore previously discussed, that analog measurements from various logging sections contained in sonde 2 may preferably be introduced into analog channel multiplexer 122. Multiplexer 122 may then conveniently select the desired analog channel input in response to timing signal 121a for conversion to digital form be analog-to-digital converter 123 after delivery thereto on multiplexer output 122a. For purposes of illustration, FIG. 2 illustrates that analog signals may preferably be introduced into multiplexer 122 which may include output signal 95 from induction logging section 2B, or calibration, temperature and cable head voltage signals 128–130, respectively.

In like manner, any digital measurements present in sonde 2 may conveniently be coupled to pulse-digital channel multiplexer 125 for transmission to the surface. For example, pulse code modulation section 2D may include suitable radiation counters 84 which may receive data, from radioactivity logging section 2A. In response to further timing signals 121C and 121D from timing circuit 121, counters 84 may deliver on outputs 83A and 82a information contained in counters 135 and 131 to pulse/digital multiplexer 125 for transmission to the surface.

It will be appreciated that these outputs 83A and 82a will contain radiation counts functionally related to short and long space radiation data as hereinbefore noted. It will further be appreciated that the various timing signals generated by timing circuit 121 may preferably be functionally related to desired time and order of sampling of measured parameters and to indications of depth generated from the well site system and transferred on cable 3 to section 2D, so as to cause the sampling of parameters within the borehole at predetermined depth intervals, times and sequences. Timing circuit 121 may also generate an appropriate sample rate signal 121e which controls the rate at which analog-to-digital converter 123 will convert the analog information present at the inputs to analog channel multiplexer 122.

It will further be seen from FIG. 2, that pulse code modulation section 2D is provided with reset circuitry 135. It will be noted that timing circuit 121 in the present illustration, must be inhibited from generating timing signals causing the sampling and transmission of data presented to multiplexers 122 and 125 until the acoustic information contained on the output of acoustic logging section 2C is no longer present. Still further, it will be noted that in order for timing circuit 121 to count the occurrences of the output in order to determine when to generate the various timing signals, when more than one output is desired prior to sampling and transmitting other parameters presented to PCM section 2D, it will be necessary for timing circuit 121 to be reset at appropriate intervals. Accordingly, reset circuitry 135 provides a reset signal 135a to timing circuit 121 which will appropriately reset timing circuit 121 after application of power to the PCM system or indication of the last acoustic output is received by timing circuit 121 on sync circuit output 120a and is delivered to reset circuitry 135 on reset input line 135b.

Thus, in summary, it will be seen that in response to various timing signals generated by timing circuit 121 which, in turn, are generated for depth information and the like contained on cable 3, pulse code modulation section 2D will present on output 132 of converter 123 and processor output 123c digitized representations of any combination or order of analog measurements made in sonde 2. In like manner, output 133 of multiplexer 125 will contain in any desired sequence and at any desired depth or time interval, digitized representations of desired pulse or digital measurements made in sonde 2. These outputs 132, 123c, 133 will be delivered to a conventional line driver 127 for delivery on logging cable 3 to the well site system.

It will be noted that in order to decode the digital representations carried on cable 3 of the various logging parameters measured, it will be necessary to provide synchronization to the circuitry of the well site system. Accordingly, it will be seen in FIG. 2 that an appropriate synchronization generator 134 provides a synchronization output 134a to line driver 127 for delivery to the surface.

Figure 3:
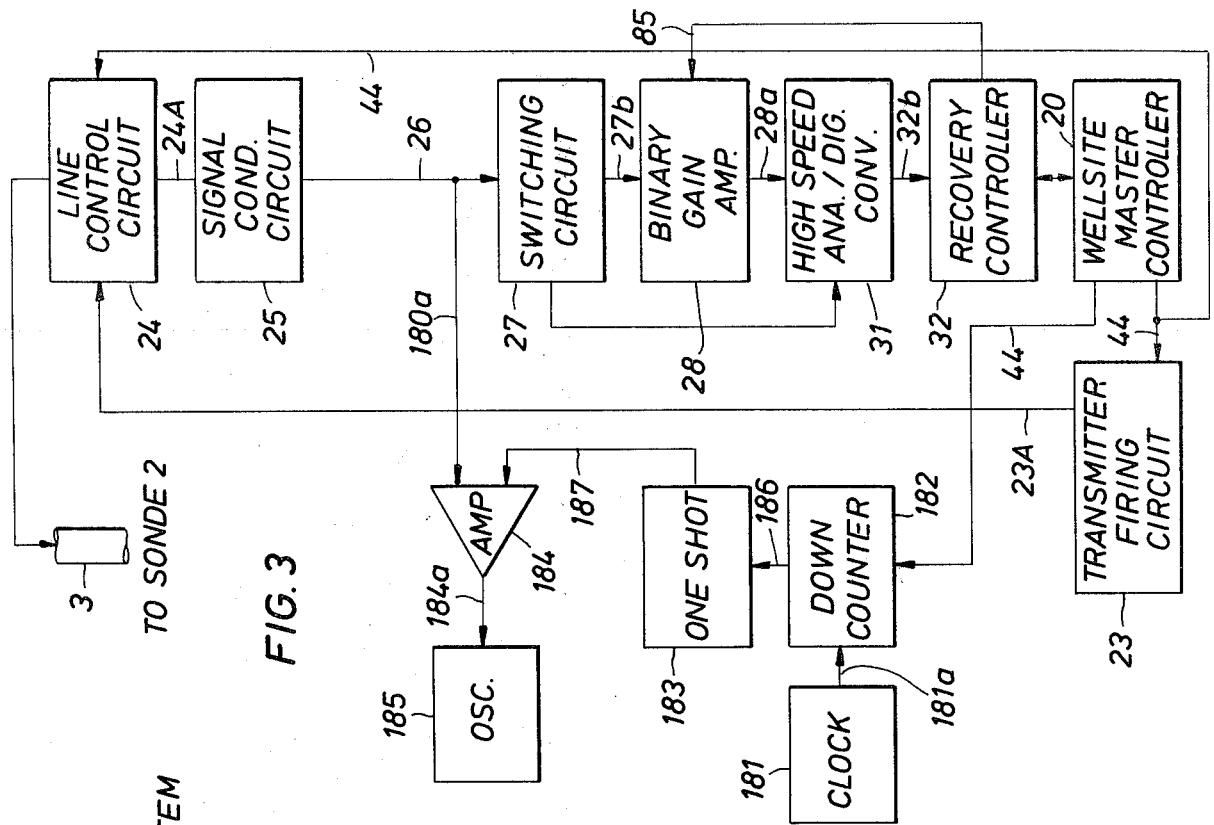
FIG. 3 is a more detailed functional representation of the apparatus of FIG. 1 when in a particular operating mode.

Referring now to FIG. 3, there may be seen a greatly simplified functional diagram of a portion of the uphole circuits comprising the apparatus located at the well site system which illustrate a particular configuration of a portion of the well site system suitable for obtaining, processing, recording, storing, and the like, information associated with acoustic logging measurements, and more particularly, acoustic logging section 2C. As may be seen from FIG. 3, controller 20 may preferably generate logging data command signals 44 which may be functionally related to depth of sonde 2 and may be derived from information provided to master controller 40 by depth controller 12 on depth data/control channel 21 (shown in FIG. 1).

This command signal 44 may be communicated to a suitable transmitter firing circuit 23 which, in turn, generates transmitter firing signal 23A containing necessary information for acoustic logging section 2C, including signals for triggering the transmitters and receivers (not shown), and the like. Accordingly, firing signal 23A may be delivered to line control circuit 24 which, in turn, may be adapted by command signal 44 from master controller 20 to deliver firing signal 23A to the appropriate conductor of loggiing cable 3 so as to be communicated to transmitter logic circuitry and receiver logic circuitry of acoustic logging section 2C (not shown).

Referring again to FIG. 3, it may, for purposes of illustration, be assumed that in response to a suitable transmitter firing signal 23A received by acoustic logging section 2C on logging cable 3, acoustic energy has been delivered to and received from the formation by acoustic logging section 2C, and it may be further assumed that a functional response thereto is present on logging cable 3. Accordingly, and as more particularly illustrated in FIG. 3, these acoustic responses may conveniently be communicated on logging cable 3 to line control circuit 24 which may select the appropriate conductor of logging cable 3 containing these responses. These selected measurement signals may thereafter be transferred as output 24A to signal conditioning circuit 25 which may appropriately contition the signals on logging cable 3 for later processing.

The contitioned signals 26 may thereafter be delivered to switching circuit 27 wherein, as hereinbefore stated, they may preferably be routed as signal 27b to a binary gain amplifier 28. The output 28a of the binary gain amplifier 28 will then be delivered to high speed analog-to-digital converter 31. As hereinbefore stated, in some cases the signals reaching switching circuit 27 are of such magnitude that amplification or attenuation is not required. Accordingly, such signals are communicated directly to converter 31 from switching circuit 27 on output 27c.

After conversion of the analog signals 28a and 27c by converter 31, these digital signals may thereafter appropriately be transferred on intput 32a to a recovery controller 32 and thereafter transferred to well site master controller 20 on line 32b. As hereinbefore noted, a gain control signal 85 may be communicated to binary gain amplifier 28 from recovery controller 32 which, in turn, may derive appropriate gain control information from the master controller 20 which is transmitted to recovery controller 32 on data line 32B.

As further indicated in FIG. 3, it may be desirable to display various information associated with acoustic logging section 2C such as real time acoustic signatures for purposes of monitoring and the like. Accordingly, a conventional oscilloscope 185 may be provided for such purposes. More particularly, acoustic information present on output 26 may be transferred as acoustic signature signal 180a to a suitable amplifier 184 and thereafter to the oscilloscope 185 on outpuut 184a. Moreover, it may be a desirable feature to provide marker generator circuitry wherein information in addition to the acoustic signature signal 180a and functionally related thereto may be simultaneously displayed in the form of visible markers or indicators on oscilloscope 185. Accordingly, this circuitry may preferable be composed of a clock 181 which communicates timing signals on output 181a to a downcounter 182 which, in turn, may be conventionally arranged so as to compare signals from clock 181 with information from the master controller 20 communicated to downcounter 182 in data command signal 44. Upon such comparison, the counter 182 may preferably provide a counter signal 186 to a suitable one shot 183 which, in turn, may generate a conventional pulse output 187 which is transmitted to amplifier 184 for display on oscilloscope 185.

Figure 5:
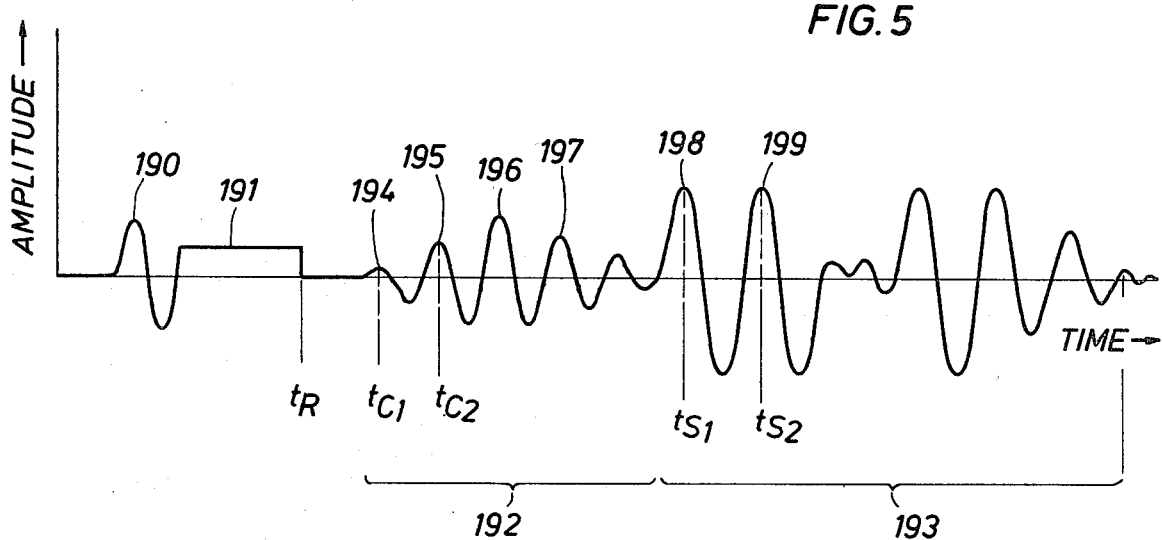
FIG. 5 is a typical acoustic signature wareform as derived by a portion of the present invention.

Referring now to FIG. 5, there may seen an illustration of a typical waveform generated in the operation of the acoustic logging function of the present invention which may be presented to the analog-to-digital (A–D) converter 31 of FIG. 1 or converter 123 of FIG. 2 for conversion to digital form prior to processing by controller 20. This waveform includes what is known as the "acoustic signature" comprised of a compressional wave 192 and shear wave 193.

As previously described, a pulse 190 of acoustic energy is conventionally transmitted into a borehole by a suitable transmitter carried on the sonde and well known in the art, conventionally of 20 KHz in frequency. At some later point in time functionally related to the time it takes the acoustic energy to traverse the borehole and reach the receiver of the acoustic logging tool, the compressional wave 192, having amplitudes such as those depicted in FIG. 5 as 194–197 will arrive at the receiver, followed by a shear wave 193 with amplitudes 198–199.

The relationship between the characteristics of the compressional and shear waves 192 and 193 respectively and formation properties have been treated extensively in the literature, and accordingly, will not be discussed herein. Suffice it to say that it has been known in the prior art that the time it takes for the compressional and shear waves to traverse the borehole from the transmitter to receiver (represented in FIG. 5 as the time from the pulse 190 to the first arrival 194 of the compressional wave 192 and the first arrival 198 of the shear wave 193, respectively), the relative amplitudes of the various cycles of the signature, and the like, contain tremendous information regarding the formation, such as porosity and other lithological properties.

In the past, however, numerous difficulties were encountered in attempting to analyze these signatures for this information. As aforementioned, analog circuitry was provided for detecting arrival times but suffered from amplifier drift problems, noise susceptibility, and so forth. A–D converters were utilized, but only to convert solutions provided by analog hardwired circuitry for acoustic travel time and the like (which were relatively low frequency information) into digital form.

Moreover, because the processing of the signatures conventionally occurred in analog form in real time, it was not appreciated that the acoustic signature could be digitized, and if done successfully, would enable sophisticated digital analysis techniques to be applied to the signature to detect information heretofore thought impossible or impractical to obtain from the signature, such as shear wave arrivals.

More particularly, due to difficulty in determining shear wave, prior to the subject invention little success, if any, had been achieved in detecting such waves with analog methods. This is so, notwithstanding a belief in the industry that information regarding shear wave travel time, in addition to that of compressional waves, would permit determination of mechanical matrix parameters, such as Youngs Modulus, so as to not only determine porosity, for example, but to further enable determination of the particular composition of the borehole material (shale, dolomite, etc.).

Figure 6A:
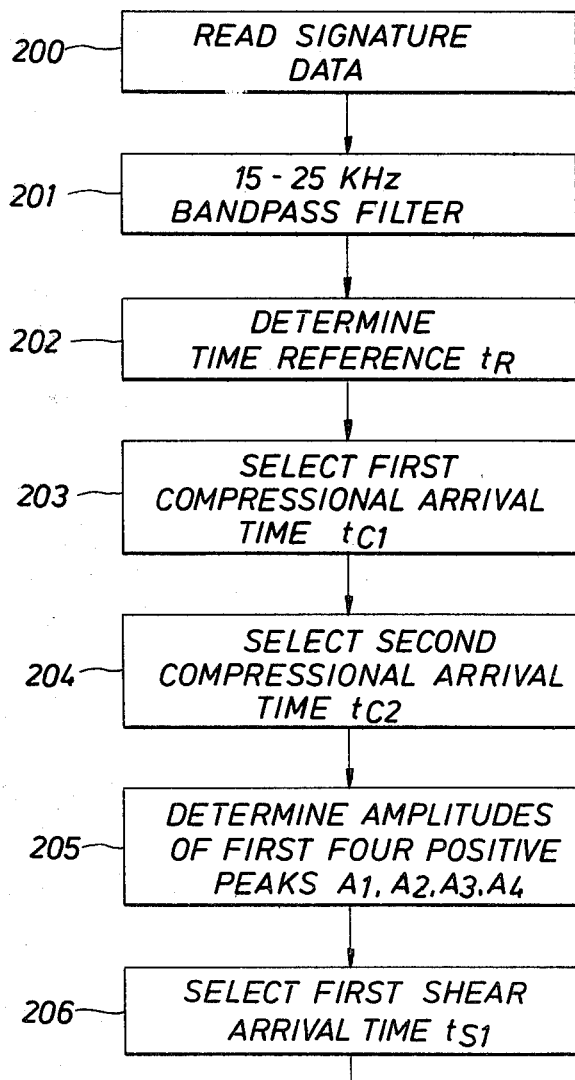
FIGS. 6A and 6B depict a functional description of the shear and compressional arrival and reverberation detection of the present invention.
Figure 6B:
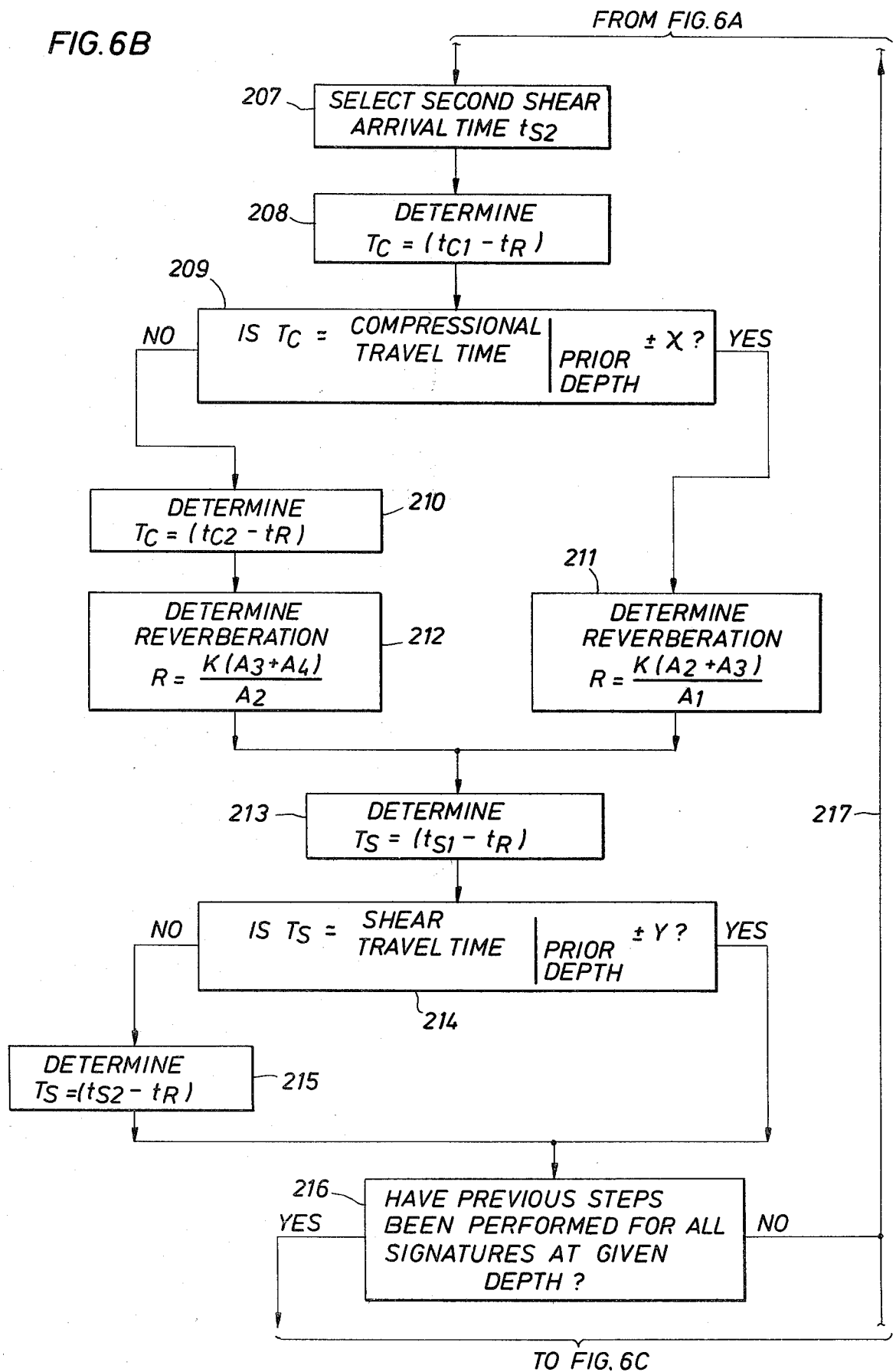
Figure 6C:
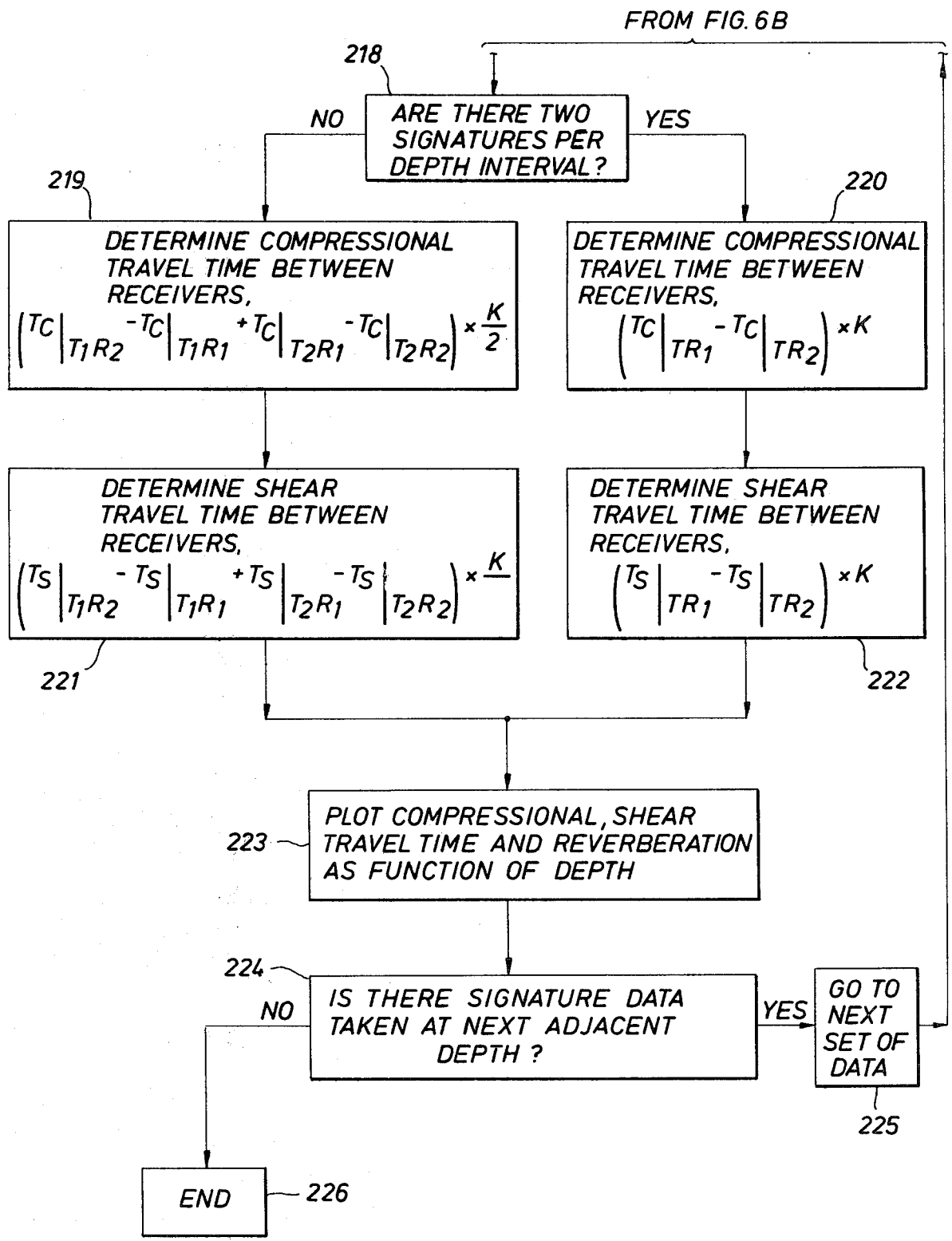

Referring now to FIG. 6, there may be seen a functional diagram of the methods deployed in the apparatus of the subject invention to determine the various parameters of interest in the acoustic signature, and, in particular, the operations performed by the controller 20 on the acoustic logging data. It will first be appreciated that a particular signal, such as that of FIG. 5, will first have been sampled at discrete time intervals by the A–D converter and converted to, for example, one thousand digital numbers which will be stored in the primary storage 35 or secondary storage 36 for processing.

As indicated in block 200 of FIG. 6, in response to a command signal 37 from controller 20, a first set of these digital numbers will be retrieved from storage 35 or 36 into core memory of the controller 20 for processing. As further indicated in block 201, this data will then be preferably filtered by a digital band pass filter having a pass-band of 15–25 KHz. The reason for this step, is because, as previously noted, the signature is on the order of 20 KHz, and it is desired to filter noise prior to further processing.

Referring next to block 202, it will be seen that by scanning and comparing all the withdrawn samples, the controller 20 may then select the sample corresponding to a particular time reference $t_R$ by looking for the first negative-going ramp larger than a pre-set noise level. The purpose of the blanking period $t_R$ is to provide a reference time from which to measure to determine points of interest on the acoustic signature, which may correspond to a known time period during which the A–D converters may be idle, since, given the acoustic tool transmitter-receiver separation and pulse frequency, a suitable period may be conventionally selected.

In block 203, the controller 20 is next instructed to determine the sample corresponding to the first compressional arrival 194 of the first half-cycle of the signature. Criteria utilized for this determination is that the sample must follow a positive sloping series of samples, precede a negative sloping series, and must have a magnitude above a predetermined and expected noise level.

Occasionally, a quantum jump in formation acoustic travel path caused by formation characteristics may cause the actual travel time to be truly represented by the second peak rather than the first, for reasons explained in the literature. Accordingly, in block 204, a second compressional arrival is determined by controller 20 in like manner to the first arrival to provide for this eventuality. Next, as represented by block 205, the controller 20 will select samples corresponding to amplitudes of the first four positive peaks of the signature for reasons to be explained hereinafter. Then, as with the compressional arrival, the first and second shear arrival samples are selected using, however, a different search criteria due to the differing characteristics of shear waves. Here, samples are scanned for a sample corresponding to a positive peak having an amplitude approximately twice or greater than the previous peak (since shear waves are much larger than compressional waves) and/or a phase difference from the compressional wave of 90 degrees or more, to be expected since travel paths are different between shear and compressional waves.

Block 208 then represents the determination made by the controller 20 of compressional travel time $T_c$, subtracting out the known time constant $t_R$. In block 209 the controller 20 determines if the compressional travel time thus calculated in block 208 is within a predetermined range of $\pm x$ microseconds of the compressional travel time calculated for a previous depth, with x known emperically to be on the order of 20 microseconds.

As previously discussed, if $T_c$ is outside this range, it is assumed that a "cycle skip" described in the literature has occurred, and thus a next choice for $T_c$ is employed at block 210, utilizing the second positive half-cycle of the compressional wave, as determined in block 204.

In block 212, a reverberation parameter is then determined from the compressional amplitudes indicated. It will be noted from block 211 that the first three positive half-cycles are used if no cycle skip is detected in block 209, whereas the second through fourth positive half-cycles are utilized if a cycle skip was detected. The reverberation parameter may conceptually be thought of as indicative of the rate at which the compressional wave dies out, whereby a low value may indicate a "softer formation," e.g., a gas-sand mixture in which gas attenuates the wave more extensively than would water in a corresponding water-sand mixture.

After reverberation is determined, in like manner to block 208, the controller 20 will determine a shear wave travel time $T_s$ again subtracting out the known constant $t_R$. Also, similar to block 209-211, a comparison will be made to the $T_s$ value calculated from a previous adjacent depth, and if it is not within a $\pm y$ microsecond range, also 20 microseconds, the shear arrival time will be determined in block 215 utilizing the second positive half-cycle 199 of the shear wave 193.

There are numerous configurations of transmitters and receivers in conventional acoustic logging tools well known in the art which are suited for the acoustic logging techniques of the present invention herein described, and thus they will not be discussed in detail. In particular, however, it is typical to have various transmitter-receiver pairs fired at approximately the same depth and vertically upward and downward, to attempt to compensate for tool misalignment and the like.

Accordingly, in block 216, it is contemplated that a next set of thousand samples, for example, of a next digitized acoustic signature corresponding to another transmitter-receiver pair fired at the same approximate depth will be in the storage 35 or 36. Thus, the controller 20 will recycle on line 217 to block 200 to read the next signature data generated at that same depth, and will thereafter determine the same parameters as with the prior signature in accordance with blocks 200-215 ($T_c$, $T_s$, etc.) until no further signatures at that depth interval remain, whereupon the controller cycles to the state represented by block 218.

At block 218 a determination is made of whether there are two or four transmitter-receiver pairs of data per depth interval. If there are two, this corresponds to block 220 and a conventional acoustic tool wherein, for a given depth, a transmitter (T) is fired once and received first at one receiver ($R_1$), then fired again and received at a next receiver ($R_2$), functionally represented as $TR_1$, $TR_2$. At block 220, the compressional travel time is then calculated between $R_1$ and $R_2$, with K being a constant to adjust for receiver separation.

Similarly, block 219 corresponds to another conventional acoustic receiver-transmitter tool configuration, wherein a first and second receiver ($R_1$, $R_2$) are place vertically between an upper first transmitter ($T_1$) and a lower transmitter ($T_2$) on the sonde. This tool, for a given borehole depth, is then conventionally fired and the acoustic signature picked up at the respective receivers in a typical order such as $T_1R_2$, $T_1R_1$, $T_2R_1$, and $T_2R_2$. In block 219, the compressional travel time between receivers $R_1$ and $R_2$ is thus calculated by calculating the average travel time between the two receivers $R_1$ and $R_2$ in the vertically upward and vertically downward direction, the division by two being necessary to average out the travel times in both directions. Again as with block 220, a constant K is provided to adjust for the particular receiver separation.

It will be noted in blocks 221 and 222, that determination similar that performed in blocks 219 and 220 are performed to find the shear travel time between receivers, the particular block 221 or 222 being selected dependent upon the number of signatures per depth interval. In other words, if one transmitter and two receivers are utilized ($TR_1$, $TR_2$) then the controller 20 will utilize block 222. However, if there are two transmitters and two receivers ($T_1R_2$, $T_1R_1$, $T_2R_1$, $T_2R_2$), then block 221 will be utilized.

It will be seen from block 223 that once the compressional, shear travel times, and reverberation have thus been determined from the previous functional blocks for a particular borehole depth, these values will appropriately be plotted out in conventional format on a plotter such as plotters 41 or 42. Thereafter, the controller 20 will determine if there are additional signatures at a next adjacent depth within the borehole present in the storage 35 or 36 for further processing. If so, as represented by block 225, the next set of acoustic signatures for the next borehole depth will be operated upon in accordance with the functional steps indicated in blocks 220-223 to determine and plot compressional, shear travel times, and reverberation at this next adjacent depth until there is no more signature data to be processed, whereupon, as represented by block 226, the process ends.

Figure 4:
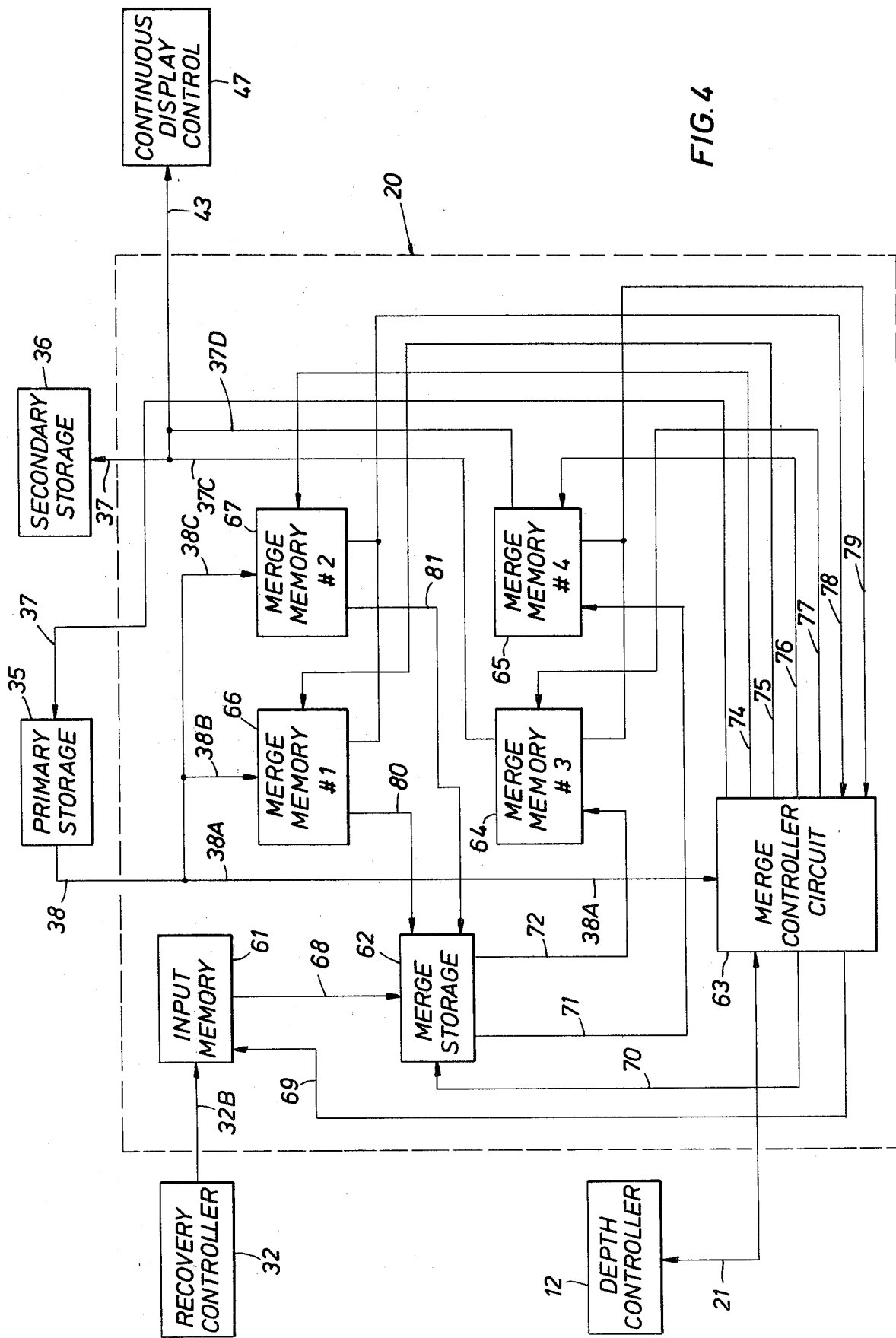
FIG. 4 is another functional representation of the merger feature of the present invention, including a more detailed representation of the master controller portion of the apparatus depicted in FIG. 1.

Referring now to FIG. 4, there will be seen a general functional representation of the manner in which the data merging of the present invention is accomplished in a preferred embodiment. A primary storage 35, such as a conventional tape drive, may be provided for storing electrical data signals composed of digital representations of well logging measurements derived correlative to a sequence of preselected depths within a borehole. Any desired number of such representations may be retrieved from the primary storage 35 in response to an input signal 37 from a merger controller circuit 63, so as to cause such representations to be delivered out of the primary storage 35 on primary storage output 38 to a suitable merge memory 1, 66, or a merge memory 2, 67, on their respective merge memory inputs 38b or 38c. The merger memories 66 and 67 preferably each provide a memory output 78 delivered to the merge circuit 63, for instructing the merge circuit 63 as to when a particular merge memory 66 or 67 has had all logging measurements removed therefrom, in which case the particular merge memory will be available to receive further representations from the primary storage 38 in a manner previously described.

It will be noted that the merge memories 66 and 67 may further be provided with correlative merge controller outputs 75 and 74. In response to each controller output 75 and 74 from the merge contoller 63, the respective merge memories 66 or 67 will sucessively deliver on their respective memory outputs 80 and 81 digital representations of logging measurements derived at successive depths stored in the memories 66 and 67 to a suitable merge storage 62. More particularly, logging measurements in the primary storage 38 are preferably stored therein in the order in which they were derived at successively deeper or shallower preselected depth intervals. The order of these measurements will preferably be retained throughout all transfers through memories 66 and 67, merge storage 62, memories 64 and 75, and eventually secondary storage 36, as will all real-time or historical measurements transferred through the input memory 61, storage 623, merge memories 64 and 65, and to secondary storage 36.

It will be noted that the merge controller 63, in response to the memory output 78 from the memories 66 and 67, may be designed so as to generate a controller output 74 or 75 so as to cause only one merge memory, 66 or 67, to generate memory outputs 80 or 81, while the other merge memory receives a next number of digital representations on merge memory input 38b or 38c from the primary storage 35. This technique may be recognized as "double-buffering," a technique well known in the art whereby measurements may be selectively retrieved from or stored in one memory while a second memory is being filled with or "reading out" blocks of data to input or output devices. When all of the data is thus sequentially retrieved from the first memory, data will thereafter be sequentially retrieved from the second filled memory while the depleted first memory is thus being again filled with data blocks.

Referring again to FIG. 4, it will further be seen that the well site controller 20 preferably will include an input memory 61 for storing digital representations of well logging measurements derived by the sonde 2 in a manner previously described. It will be recalled that the recovery controller 32 may deliver each such representation, which has been derived on a depth-dependent basis, on the controller output 32b to the well site controller 20 or, more particularly with respect to FIG. 4, to the input memory 61. It will further be recalled that a depth controller 12 will preferably be provided for generating a sequence of pulses derived from rotation of the sheave wheel, which is, in turn, correlative to movement of the sonde 2 within the borehole, indicative of and related to different selected depths along a portion of the borehole. These pulses may be delivered as depth/data control signal 21 to the merge controller 63 of the well site controller 20.

As each pulse is delivered on control signal 21, a measurement derived in response thereto at a correlative depth will accordingly be present in the input memory 61. The merge controller 63 will, in response to the control signal 21, generate a merge controller output 69, causing a transfer of the sample presently stored in the input memory 61 to the merge storage 62 on the memory output 68. As previously noted, the merge controller 63 is preferably provided with controller outputs 74 and 75 for commanding the correlative merge memory 67 or 66 to deliver a correlative data sample derived at a particular depth from the respective merge memory 67 or 66 to the merge storage 62. Each controller output 74 and 75 will preferably be generated by the merge controller 63 in functional response to receipt by the merge controller 63 of a pulse from the control signal 21 correlative to a particular depth at which a measurement derived by the sonde 2 which is stored in the input memory 61 was derived. Accordingly, it will be appreciated that in response to such a pulse on control signal 21, a next data sample from the input memory 61 and a next data sample from either the merge memory 66 or 67 will accordingly be caused to be transferred and stored in the merge storage 62, and each such pair of next samples will have been derived at correlative depths.

Still referring to FIG. 2, there will also be seen a merge memory 64, and a merge memory 65, each having correlative storage outputs 72 and 71. It will also be noted that a merge controller output 70, generated by the merge controller 63 in response to a pulse from control signal 21, may be delivered to the merge storage 62. The purpose of this controller output 70 is to cause the merge storage 62 to deliver in response thereto the data samples stored in the merge storage 62 on the storage output 71 or 72 to their correlative merge memories 65 or 64 in a manner to be described. In like manner to the merge memories 66 and 67, there will be seen in FIG. 4 a memory output 79 delivered from the merge memories 64 and 65 to the merge controller 63. Also, in like manner, there will be seen merge controller outputs 76 and 77 delivered from the merge controller 63 to the correlative merge memories 65 and 64, these controller outputs being correlative to those of controller outputs 74 and 75 for the merge memories 67 and 66. It may thus be appreciated that the merge memories 64 and 65 are preferably arranged in a "double-buffering" mode, similar to that of the merge memories 66 and 67.

Information carried on the memory output 79 may instruct the merge controller 63 as to the relative status of the merge memories 64 and 65. More particularly, the merge controller 63 will thus detect when a particular merge memory 64 or 65 has been filled with a full "block" of data, such as samples derived over a ten foot depth increment. When this occurs, a merge controller output 76 or 77 will command the particular memory 65 or 64 to deliver its respective stored contents on merge memory 37d or 37c to the hereinbefore noted secondary storage 36 by means of the input signal 37, or to a suitable continuous display control 47 by means of the log data information signal 43. While data samples are thus being "read out" from a particular merge memory, the merge controller 63 is, by means of the merge controller output 70, able to command the merge storage 62 to begin filling the remaining one of merge memores 64 or 65 by causing the merge storage 62 to deliver successive paired data samples stored in the merged storage 62 to the particular merge memory 64 or 65 by means of selecting the appropriate storage output 71 or 72 on which these data samples will be delivered.

In another embodiment of the present invention, it will be appreciated that a tape of data from a first logging run may be stored in the primary storage 35 of FIG. 1. More particularly, this data may be stored on one channel of tape in successive blocks or records of data comprised of, for example, one thousand samples, each sample corresponding to a logging measurement taken at successive adjacent borehole intervals. Furthermore, different logging measurements taken from another type of logging tool, for example, at correlative successive depths may, in like manner, be stored on a different tape in secondary storage 36 in corresponding blocks or records.

It will be appreciated that each such block of data, whether stored in primary storage 35 or secondary storage 36, may further contain identifying data as to starting depth at which the first sample in the particular block was taken. The controller 20 may thus first retrieve this depth from the primary storage on line 38 for a block of data stored in the primary data storage 35 for which merged data is desired. The controller 20 will thereafter search the depth data for the data blocks stored in the secondary storage 36, so as to position the tape therein at the block of data corresponding to the block of data in the primary storage 35 to be merged.

In response to signal 37 from the controller 20, the secondary storage 36 may then be caused to deliver the block of data to appropriate core memory of controller 20 which, in turn, then delivers the data to primary storage 35 on line 37 to be recorded on the tape in primary storage 35 in a second channel adjacent to that containing the data block of channel 1 to be merged. The controller 20 may then advance the tape of primary storage 35 to a next adjacent block of data, advance the tape of secondary storage 36 to the next adjacent block of data, retrieve the block from secondary storage 36, and rewrite it on channel 2 of the primary storage 35 tape adjacent the corresponding data of channel 1 taken at correlative depth within the borehole. After repeating the step several times, it will be appreciated that the result will be production of only one tape of merged data in primary storage 35 from two tapes, each which separately contain logging measurements derived at successive and correlative depths. The merged tape will have a plurality of adjacent channels of data, each channel being comprised of successive blocks of data samples taken at preselected increments of borehole depth. Moreover, the blocks of data for each channel will thus be aligned adjacent one another, so that the depth at which an Nth sample in one block will correspond to the same depth for this same Nth sample in an adjacent block.

Many modifications and variations besides those specifically mentioned may be made in the techniques and structures described herein and depicted in the accompanying drawings without departing substantially from the concept of the present invention. Accordingly, it should be clearly understood the forms of the invention described and illustrated herein are exemplary only, and are not intended as limitations on the scope of the present invention.

I claim:

1. A method for detecting acoustic parameters from acoustic energy traversing a borehole, comprising:
   introducing a pulse of acoustic energy within said borehole at a first depth;
   receiving a first acoustic signature signal within said borehole in response to said pulse having first, second, third and fourth positive peaks;
   deriving a plurality of first digital representations from said received signal;
   determining from said first digital representations first and second compressional arrival times;
   determining from said first digital representations first and second shear arrival times;
   determining from said first digital representations a first, second, third and fourth amplitude corresponding to respective ones of said first, second, third and fourth peaks;
   determining a third compressional arrival time at a second depth adjacent said first depth;
   deriving a difference between said first and said third compressional arrival times; and
   selecting a compressional arrival time as a function of said difference.

2. The method of claim 1, further including
   determining a first reverberation parameter from said first, second and third amplitudes when said difference is equal to or less than a preselected amount; and
   determining a second reverberation parameter from said second, third and fourth amplitudes when said difference is greater than said preselected amount.

3. The method of claim 2, further including the steps of
   detecting a third shear arrival time at said second depth;
   deriving a difference between said first and said third shear arrival times; and
   selecting a shear arrival time as a function of said difference between said first and said third shear arrival times.

4. The method of claim 3, further including the steps of
   receiving a second acoustic signature signal within said borehole in response to said pulse;
   deriving a plurality of second digital representations from said second acoustic signature signal; and
   repeating the preceding steps of claims 1–3 wherein said second digital representations become said first digital representations.

5. The method of claim 4, further including
   deriving a difference between said compressional arrival times as a function of said difference determined from said first and said second digital representations; and
   deriving a difference between said shear arrival times as a function of said difference determined from said first and second digital representations.

* * * * *